(12) United States Patent
Casadó Burillo et al.

(10) Patent No.: US 12,459,973 B2
(45) Date of Patent: Nov. 4, 2025

(54) PEPTIDE COMPOUNDS FOR REDUCING SIDE EFFECTS OF CB1 RECEPTOR AGONISTS

(71) Applicants: UNIVERSITAT DE BARCELONA, Barcelona (ES); UNIVERSITAT POMPEU FABRA, Barcelona (ES); UNIVERSITAT AUTÒNOMA DE BARCELONA, Barcelona (ES); INSTITUTO DE MEDICINA MOLECULAR JOÃO LOBO ANTUNES, Lisbon (PT); FACULDADE DE MEDICINA DA UNIVERSIDADE DE LISBOA, Lisbon (PT)

(72) Inventors: Vicent Casadó Burillo, Barcelona (ES); Estefania Moreno Guillén, Barcelona (ES); Rafael Maldonado López, Barcelona (ES); David Andreu Martínez, Barcelona (ES); Maria Gallo, Barcelona (ES); Leonardo Pardo Carrasco, Barcelona (ES); Miguel Castanho, Lisbon (PT); Vera Neves, Lisbon (PT); Marco Cavaco, Lisbon (PT)

(73) Assignees: UNIVERSITAT DE BARCELONA, Barcelona (ES); UNIVERSITAT POMPEU FABRA, Barcelona (ES); UNIVERSITAT AUTONOMA DE BARCELONA, Barcelona (ES); INSTITUTO DE MEDICINA MOLECULAR JOAO LOBO ANTUNES, Lisbon (PT); FACULDADE DE MEDICINA DA UNIVERSIDADE DE LISBOA, Lisbon (PT)

( * ) Notice: Subject to any disclaimer, the term of this patent is extended or adjusted under 35 U.S.C. 154(b) by 847 days.

(21) Appl. No.: 17/766,355

(22) PCT Filed: Oct. 2, 2020

(86) PCT No.: PCT/EP2020/077642
§ 371 (c)(1),
(2) Date: Apr. 4, 2022

(87) PCT Pub. No.: WO2021/064165
PCT Pub. Date: Apr. 8, 2021

(65) Prior Publication Data
US 2024/0059737 A1    Feb. 22, 2024

(30) Foreign Application Priority Data

Oct. 3, 2019   (EP) ..................................... 19382856

(51) Int. Cl.
*C07K 7/08* (2006.01)
*A61P 25/02* (2006.01)
*A61P 25/28* (2006.01)

(52) U.S. Cl.
CPC ............... *C07K 7/08* (2013.01); *A61P 25/02* (2018.01); *A61P 25/28* (2018.01)

(58) Field of Classification Search
CPC .. C07K 7/08; A61P 25/02; A61P 25/28; A61P 25/00; A61K 38/00
See application file for complete search history.

(56) References Cited

FOREIGN PATENT DOCUMENTS

| | | |
|---|---|---|
| EP | 2878306 | 6/2015 |
| JP | 2018513670 A | 5/2018 |

(Continued)

OTHER PUBLICATIONS

Starobova et al., Pathophysiology of Chemotherapy-Induced Peripheral Neuropathy. Front Mol Neurosci. May 31, 2017; 10:174. doi: 10.3389/fnmol.2017.00174. PMID: 28620280; PMCID: PMC5450696 (Year: 2017).*

(Continued)

*Primary Examiner* — Randall L Beane
(74) *Attorney, Agent, or Firm* — Casimir Jones, S.C.; Tristan A. Fuierer (57) ABSTRACT

The present invention relates to compounds of formula (I)

(I)
AA¹-AA²-D-Ile-AA³-D-Met-D-Tyr-D-Ala-D-Tyr-D-Val-D-Ala-Gly-D-Ile-D-Leu-D-Lys-D-Arg-D-Trp-NH₂

(Continued)

or a pharmaceutically acceptable salts thereof, to processes for their obtention and to their therapeutic indications.

9 Claims, 1 Drawing Sheet

Specification includes a Sequence Listing.

(56) References Cited

FOREIGN PATENT DOCUMENTS

| WO | WO2006/077035 A1 | 7/2006 |
|---|---|---|
| WO | WO 2014/015298 | 1/2014 |
| WO | WO-2016120843 A1 | 8/2016 |

OTHER PUBLICATIONS

O'Carroll, Everything You Should Know About Allodynia, Healthline (updated Jul. 2, 2024), 9 pages, also available at https://www.healthline.com/health/allodynia (last visited Nov. 6, 2024) (Year: 2024).*

Glaucoma, NEI, nei.nih.gov, 6 pages (Dec. 10, 2024), also available at https://www.nei.nih.gov/learn-about-eye-health/eye-conditions-and-diseases/glaucoma (last visited Apr. 7, 2025) (Year: 2024).*

Anorexia Nervosa, Eating Disorders, Hopkinsmedicine.org, 9 pages (2019); also available at https://www.hopkinsmedicine.org/health/conditions-and-diseases/eating-disorders/anorexia-nervosa (last visited Apr. 7, 2025) (Year: 2019).*

Oller-Salvia B., et al., "Blood-brain Barrier Shuttle Peptides: an Emerging Paradigm for Brain Delivery," Chemical Society Reviews, Aug. 22, 2016, vol. 45, No. 17, pp. 4690-4707.

Prades R., et al., "Applying the Retro-Enantio Approach to Obtain a Peptide Capable of Overcoming the Blood-Brain Barrier", Peptides, Angewandte Chemie (International Edition), 2015, vol. 54, No. 13, pp. 3967-3972 (7 Pages), DOI: 10.1002/anie.201411408.

Watabiki T., "Status of Drug Development Targeting the Cannabinoid System", Pharmacia, 2016, vol. 52, No. 9, pp. 850-854.

Zheng X., et al., "A Hybrid siRNA Delivery Complex for Enhanced Brain Penetration and Precise Amyloid Plaque Targeting in Alzheimer's Disease Mice", Acta Biomaterialia, 2017, vol. 49, Nov. 2016, pp. 388-401 (41 Pages), DOI: 10.1016/j.actbio.2016.11.029.

Al-Ghezi et al., Combination of Cannabinoids, Δ9-Tetrahydrocannabinol and Cannabidiol, Ameliorates Experimental Multiple Sclerosis by Suppressing Neuroinflammation Through Regulation of miRNA-Mediated Signaling Pathways. Front Immunol. Aug. 21, 2019;10:1921. 17 pages.

Allen. Dronabinol Therapy: Central Nervous System Adverse Events in Adults With Primary Brain Tumors. Clin J Oncol Nurs. Feb. 1, 2019;23(1):23-26.

Baron et al., Patterns of medicinal cannabis use, strain analysis, and substitution effect among patients with migraine, headache, arthritis, and chronic pain in a medicinal cannabis cohort. J Headache Pain. May 24, 2018;19(1):37. 28 pages.

Botta et al., Design and development of stapled transmembrane peptides that disrupt the activity of G-protein-coupled receptor oligomers. J Biol Chem. Nov. 8, 2019;294(45):16587-16603.

Buhmann et al., Evidence for the use of cannabinoids in Parkinson's disease. J Neural Transm (Vienna). Jul. 2019;126(7):913-924.

Donovan et al., Cannabis Use in Young Adult Cancer Patients. J Adolesc Young Adult Oncol. 2020 . Aug. 22, 2019. vol. 00, No. 00, Epub ahead of print. 6 pages.

Engeli. Central and peripheral cannabinoid receptors as therapeutic targets in the control of food intake and body weight. Handb Exp Pharmacol. 2012;(209):357-81.

Escudero-Lara et al., Disease-modifying effects of natural Δ9-tetrahydrocannabinol in endometriosis-associated pain. Elife. Jan. 14, 2020;9:e50356. 17 pages.

Galindo et al., Cannabis Users Show Enhanced Expression of CB1-5HT 2A Receptor Heteromers in Olfactory Neuroepithelium Cells. Mol Neurobiol. Aug. 2018;55(8):6347-6361.

Kandasamy et al., Anti-migraine effect of Δ 9-tetrahydrocannabinol in the female rat. Eur J Pharmacol. Jan. 5, 2018;818:271-277.

La Porta et al., Role of the endocannabinoid system in the emotional manifestations of osteoarthritis pain. Pain. Oct. 2015;156(10):2001-2012.

Maldonado et al., The endocannabinoid system and neuropathic pain. Pain. Feb. 2016;157 Suppl 1:S23-S32.

Miller et al., Δ9-Tetrahydrocannabinol and Cannabidiol Differentially Regulate Intraocular Pressure. Invest Ophthalmol Vis Sci. Dec. 3, 2018;59(15):5904-5911.

Russo et al., Agonistic properties of cannabidiol at 5-HT1a receptors. Neurochem Res. Aug. 2005;30(8):1037-43.

Russo et al., Clinical Endocannabinoid Deficiency Reconsidered: Current Research Supports the Theory in Migraine, Fibromyalgia, Irritable Bowel, and Other Treatment-Resistant Syndromes. Cannabis Cannabinoid Res. Jul. 1, 2016;1(1):154-165.

Valdeolivas et al., Effects of a Sativex-Like Combination of Phytocannabinoids on Disease Progression in R6/2 Mice, an Experimental Model of Huntington's Disease. Int J Mol Sci. Mar. 23, 2017;18(4):684.

Vinals et al., Cognitive Impairment Induced by Delta9-tetrahydrocannabinol Occurs through Heteromers between Cannabinoid CB1 and Serotonin 5-HT2A Receptors. PLoS Biol. Jul. 9, 2015;13(7):e1002194. 40 pages.

* cited by examiner

FIGURE 1

FIGURE 2

SEQUENCE LISTING

```
<160> NUMBER OF SEQ ID NOS: 2

<210> SEQ ID NO 1
<211> LENGTH: 37
<212> TYPE: PRT
<213> ORGANISM: Artificial Sequence
<220> FEATURE:
<223> OTHER INFORMATION: Transmembrane region 5 of cannabinoid receptor
      1 (TM5)

<400> SEQUENCE: 1

Glu Thr Tyr Leu Met Phe Trp Ile Gly Val Thr Ser Val Leu Leu Leu
1               5                   10                  15

Phe Ile Val Tyr Ala Tyr Met Tyr Ile Leu Trp Gly Arg Lys Lys Arg
            20                  25                  30

Arg Gln Arg Arg Arg
        35

<210> SEQ ID NO 2
<211> LENGTH: 10
<212> TYPE: PRT
<213> ORGANISM: Artificial Sequence
<220> FEATURE:
<223> OTHER INFORMATION: Cell penetrating peptidic sequence Tat

<400> SEQUENCE: 2

Gly Arg Lys Lys Arg Arg Gln Arg Arg Arg
1               5                   10
```

PEPTIDE COMPOUNDS FOR REDUCING SIDE EFFECTS OF CB1 RECEPTOR AGONISTS

CROSS-REFERENCE TO RELATED APPLICATIONS

This application is filed under the provisions of 35 U.S.C. § 371 and claims the priority of International Patent Application No. PCT/EP2020/077642 filed on 2 Oct. 2020 entitled "PEPTIDE COMPOUNDS FOR REDUCING SIDE EFFECTS OF CB$_1$ AGONISTS" in the name of Vicent CASADÓ BURILLO, et al., which claims priority to European Patent Application No. 19382856.3, filed on 3 Oct. 2019, both of which are hereby incorporated by reference herein in their entirety.

The present invention relates to the field of pharmacological treatment with CB$_1$ receptor agonists.

BACKGROUND ART

Nearly one in five Europeans suffers from chronic pain, affecting their working, social and family lives, and accounting for nearly 500 million lost working days each year, costing the European economy at least €34 billion. The analgesic market is expected to increase to €100 billion by 2019, which highlights the need of novel, complementary drugs that could efficiently relieve pain in chronic patients avoiding undesirable side-effects.

Activation of cannabinoid CB; receptors (CB$_1$R) by CB$_1$ receptor agonists or partial agonists such as Δ9-tetrahydrocannabinol (THC), the main psychoactive component of *Cannabis sativa*, produces pharmacological responses of great interest for therapeutic purposes, includes the treatment and/or prevention of pain such as pain associated with severe migraines, osteoarthritis, endometriosis, rheumatoid arthritis, fibromyalgia, back pain, knee pain, neuropathic pain of peripheral or central origin, orexigenic treatment, as an antiemetic during chemotherapy in the treatment of cancer, for the treatment of glaucoma, in the treatment of spasticity in patients with multiple sclerosis and in the treatment of movement disorders including among others dyskinesias, Huntington disease and Parkinson's disease (see Kandasamy R et al., Eur J Pharmacol. 2018 Jan. 5; 818:271-277; Baron E P et al., Headache Pain. 2018 May 24; 19(1): 37; Russo E B et al., *Cannabis* Cannabinoid Res. 2016 Jul. 1; 1(1): 154-165; Miller S et al., Invest Ophthalmol Vis Sci. 2018 Dec. 3; 59(15): 5904-5911; Escudero-Lara A, et al., IASP (International Association for the Study of Pain) 7th World Congress on Pain. Boston, USA. 12-16 Sep. 2018, Abstract ID: 471100; La Porta C et al., Pain. 2015 October; 156(10): 2001-12; Maldonado R. et al., Pain. 2016 February; 157 Suppl 1: S23-32; Engeli S., Handb Exp Pharmacol. 2012; (209): 357-81; Al-Ghezi Z Z et al. Front Immunol. 2019 Aug. 21; 10:1921; Allen D et al., Clin J Oncol Nurs. 2019 Feb. 1; 23(1): 23-26; Buhmann C et al., J Neural Transm (Vienna). 2019 July; 126(7): 913-924; Valdeolivas S et al., Int J Mol Sci. 2017 Mar. 23; 18(4); Donovan K A et al., J Adolesc Young Adult Oncol. 2019 Aug. 22. [Epub ahead of print]). However, this CB$_1$R activation is associated to a variety of negative effects such as memory impairment and other psychoactive responses such as anxiety alterations, and disturbances in social interaction with major consequences in *cannabis* users that constitute important drawbacks for the use of cannabinoids as therapeutic agents.

For this reason, there is a tremendous medical interest in harnessing the beneficial effects of THC and other CB$_1$ receptor agonists.

Behavioral studies carried out in mice lacking 5-HT$_{2A}$ receptors (5-HT$_{2A}$R) revealed a remarkable 5-HT$_{2A}$R-dependent dissociation in the beneficial antinociceptive effects of THC and its detrimental amnesic properties. It has been reported that specific effects of THC such as memory deficits, anxiety alterations, and social interaction are under the control of 5-HT$_{2A}$R, but its acute hypolocomotor, hypothermic, anxiogenic, and antinociceptive effects are not (Viñals X. et al; PLoS Biol. 2015 Jul. 9; 13(7): e1002194).

It has been shown that CB$_1$R and 5-HT$_{2A}$R form heteromers that are expressed and functionally active in specific brain regions involved in memory impairment and that disrupting the formation of heteromers is a valuable strategy leading to a selective abrogation of memory impairments and other undesirable side effects caused by exposure to CB$_1$R agonists such as THC (Viñals X. et al; PLoS Biol. 2015 Jul. 9; 13(7): e1002194).

It has also been disclosed that synthetic peptides with the sequence of transmembrane helices 5 and 6 of the CB$_1$ receptor, fused to a cell-penetrating peptide, are able to disrupt receptor heteromerization with 5-HT$_{2A}$R in vivo.

The inventors have now discovered new synthetic peptides which are not only able to disturb the heteromers formed by the cannabinoid receptor CB$_1$R and the serotonin receptor 5HT$_{2A}$R more efficiently than previously known peptides, but also have higher hydrolytic stability and are capable of penetrating efficiently the blood-brain barrier.

SUMMARY OF INVENTION

In a first aspect the present invention relates to the provision of compounds of formula (I)

AA$^1$ represents an aminoacid selected from the group consisting of D-Tryptophan (D-Trp), 1-naphthylalanine (D-1-Nal) and 2-naphthylalanine (D-2-Nal);

AA$^2$ represents an aminoacid selected from the group consisting of D-Leucine (D-Leu), D-Norleucine (D-Nle) and D-Phenylalanine (D-Phe); and AA$^3$ represents an aminoacid selected from the group consisting of D-Methionine (D-Met) and D-Norleucine (D-Nle).

or a pharmaceutically acceptable salt thereof, wherein

In a particular embodiment AA$^1$ represents D-Tryptophan (D-Trp).

In a particular embodiment AA$^2$ represents D-Leucine (D-Leu).

In a particular embodiment AA$^3$ represents D-Tyrosine (D-Tyr).

In a particular embodiment the compound is selected from the group consisting of:

or a pharmaceutically acceptable salt thereof.

In a second aspect the present invention relates to pharmaceutical or veterinary compositions comprising therapeutically effective amounts of compounds of formula (I) or pharmaceutically acceptable salts thereof, and pharmaceutically acceptable excipients. Pharmacy in the context of the present invention relates both to human medicine and veterinary medicine.

In a third aspect the present invention relates to compounds of formula (I) or pharmaceutically acceptable salts thereof in combination with a $CB_1$ receptor agonist, for use as a medicament.

In particular embodiment the present invention relates to compounds of formula (I) or pharmaceutically acceptable salts thereof in combination with a $CB_1$ receptor agonist, for use in the treatment or prevention in an animal, including a human, of a disease susceptible of amelioration by agonism of the $CB_1$ receptor.

In particular embodiment the disease susceptible of amelioration by agonism of the $CB_1$ receptor is selected from the group consisting of pain associated with severe migraines, osteoarthritis, endometriosis, rheumatoid arthritis, fibromyalgia, back pain, knee pain, neuropathic pain of peripheral or central origin, orexigenic treatment, as an antiemetic during chemotherapy, for the treatment of glaucoma, in the treatment of spasticity in patients with multiple sclerosis and in the treatment of movement disorders including among others dyskinesias and Parkinson's disease.

In a particular embodiment the treatment and/or prevention is capable of reducing memory impairment and/or anxiety alterations caused by the $CB_1$ receptor agonist.

In a fourth aspect the present invention relates to compounds of formula (I) or pharmaceutically acceptable salts thereof for use in reducing side effects of $CB_1$ receptor agonists, such as memory impairment and other psychoactive responses such as anxiety alterations, and disturbances in social interaction, in a patient treated with a $CB_1$ receptor agonist. A patient is considered to be a mammal, in particular a human being affected by a disease susceptible of improving by administration of a $CB_1$ receptor agonist, in particular pain, pain associated with severe migraines, osteoarthritis, endometriosis, rheumatoid arthritis, fibromyalgia, back pain, knee pain, neuropathic pain of peripheral or central origin, orexigenic treatment, as an antiemetic during chemotherapy, for the treatment of glaucoma, in the treatment of spasticity in patients with multiple sclerosis and in the treatment of movement disorders including among others dyskinesias and Parkinson's disease.

In particular embodiment of the third, fourth, fifth and sixth aspects of the present invention the $CB_1$ receptor agonist is either a full agonist or a partial agonist.

In more particular embodiment of the third, fourth, fifth and sixth aspects of the present invention the $CB_1$ receptor agonist is selected from the group consisting of endocannabinoids produced by the mammalian body such as 2-arachidonoylglycerol (2-AG), 2-arachidonyl glyceryl ether (2-AGE, noladin ether), anandamide (N-arachidonoylethanolamine or AEA), N-arachidonoyl dopamine, palmitoylethanolamide (PEA); plant cannabinoids such as 11-hydroxy-Δ8-tetrahydrocannabinol, 11-hydroxy-Δ9-tetrahydrocannabinol, Cannabinol, Δ8-tetrahydrocannabinol, Δ9-tetrahydrocannabinol (Dronabinol, THC or Δ9-THC) and synthetic cannabinoids such as AM-2201 (1-(5-fluoropentyl)-3-(1-naphthoyl)indole), AM-678 (1-pentyl-3-(1-naphthoyl)indole), arachidonyl-2'-chloroethylamide (ACEA), CP 55,940 ([(−)-cis-3-[2-hydroxy-4-(1,1-dimethylheptyl)phenyl]-trans-4-(3-hydroxypropyl)-cyclohexanol]), HU-210, JWH-018 (1-pentyl-3-(1-naphthoyl)indole), JWH-073, linoleyl ethanolamide, levonantradol (CP 50,556-1), Nabilone, Nabiximols and WIN 55,212-2, in particular the plant-derived cannabinoid THC.

In other words, the present invention is related to methods of treatment or prevention in an animal, including a human, of diseases susceptible of amelioration by agonism of the $CB_1$ receptor by administration of pharmaceutical or veterinary compositions comprising compounds of formula (I). Methods for treatment of the aforementioned particular diseases and disorders are particular embodiments of the present invention.

In a fifth aspect the present invention relates to the use of a compound of formula (I) or a pharmaceutically acceptable salt thereof for the manufacture of a medicament for the treatment or prevention in an animal, including a human, in combination with a $CB_1$ receptor agonist, of a disease susceptible of amelioration by agonism of the $CB_1$ receptor.

In a particular embodiment the treatment and/or prevention is capable of reducing memory impairment and/or anxiety alterations caused by the $CB_1$ receptor agonist.

In a sixth aspect the present invention relates to a method for the treatment or prevention in an animal, including a human, of a disease susceptible of amelioration by agonism of the $CB_1$ receptor by administration to said animal of a compound of formula (I) or a pharmaceutically acceptable salt thereof in combination with a $CB_1$ receptor agonist.

In a particular embodiment the treatment and/or prevention is capable of reducing memory impairment and/or anxiety alterations caused by the $CB_1$ receptor agonist.

According to a fifth aspect of the present invention, the compounds of formula (I) may be prepared by a method comprising the steps of:
a) Providing the aminoacids (D-Ala, D-Arg, Gly, D-Ile, D-Leu, D-Lys, D-Met, D-1-Nal, D-2-Nal, D-Nle, D-Phe, D-Trp, D-Tyr, D-Val) forming part of the peptide,
b) Protecting the aminoacids D-Lys and D-Trp with Boc,
c) Protecting the aminoacid D-Arg with 2,2,4,6,7 pentamethyldihydrobenzofuran-5-sulfonyl,
d) Protecting the aminoacid D-Thr with t-butyl,
e) Assembling the aminoacids and the protected aminoacids in a Fmoc-Rink-amide resin effecting the couplings with an excess of Fmoc-amino acid in the presence of an excess of 2-(1H-benzotriazol-1-yl)-1,1,3,3 tetramethyluronium hexafluorophosphate (HBTU) and an excess of DIEA with DMF as solvent
f) Cleaving the protected side groups of the peptide and the peptide from the resign preferably with using $CF_3COOH/H_2O/3,6$-dioxa-1,8-octanedithiol (DODT)/triisopropylsilane.

As used herein, "a compound of formula (I) in combination with a $CB_1$ receptor agonist" refers to either a fixed combination of the compound of formula (I) and the $CB_1$ receptor agonist in one dosage unit form, or a kit of parts comprising a first composition comprising the compound of formula (I) and a second composition comprising the $CB_1$ receptor agonist for the combined administration wherein the compound of formula (I) and the $CB_1$ receptor agonist may be administered independently at the same time or separately within time intervals that especially allow that the reduction of the adverse effect of $CB_1$ receptor agonists, or any combination thereof.

As used herein the expression "$CB_1$ receptor agonist" refers to a compound capable of activating the $CB_1$ cannabinoid receptor including ligands, endocannabinoids produced by the mammalian body such as 2-arachidonoylglycerol (2-AG), 2-arachidonyl glyceryl ether (2-AGE, noladin ether), anandamide (N-arachidonoylethanolamine or AEA), N-arachidonoyl dopamine, palmitoylethanolamide (PEA); plant cannabinoids such as 11-hydroxy-Δ8-tetrahydrocannabinol, 11-hydroxy-Δ9-tetrahydrocannabinol, Cannabinol, Δ8-tetrahydrocannabinol, Δ9-tetrahydrocannabinol (Dronabinol, THC or Δ9-THC) and synthetic cannabinoids such as AM-2201 (1-(5-fluoropentyl)-3-(1-naphthoyl)indole), AM-678 (1-pentyl-3-(1-naphthoyl)indole), arachidonyl-2'-chloroethylamide (ACEA), CP 55,940 ([(−)-cis-3-[2-hydroxy-4-(1,1-dimethylheptyl)phenyl]-trans-4-(3-hydroxypropyl)-cyclohexanol]), HU-210, JWH-018 (1-pentyl-3-(1-naphthoyl)indole), JWH-073, linoleyl ethanolamide, levonantradol (CP 50,556-1), Nabilone, Nabiximols and WIN 55,212-2.

In a preferred embodiment, the $CB_1$ cannabinoid receptor agonist is Δ9-tetrahydrocannabinol (THC).

As used herein the expression "pharmaceutically acceptable" as used herein relates to compounds, materials, compositions, and/or dosage forms which are, within the scope of sound medical judgment, suitable for use in contact with the tissues of a subject (e.g. human) without significant toxicity, irritation, allergic response, or other problem or complication, commensurate with a reasonable benefit/risk ratio. Each carrier, excipient, etc., must also be "acceptable" in the sense of being compatible with the other ingredients of the pharmaceutical composition. It must also be suitable for use in contact with the tissue or organ of humans and animals without excessive toxicity, irritation, allergic response, immunogenicity or other problems or complications commensurate with a reasonable benefit/risk ratio. Suitable carriers, excipients, etc. can be found in standard pharmaceutical texts, and include, as a way of example preservatives, agglutinants, humectants, emollients, and antioxidants.

As used herein the expression "pharmaceutically acceptable salt" designates any salt which, upon administration to the patient is capable of providing (directly or indirectly) a compound as described herein. For instance, pharmaceutically acceptable salts of compounds provided herein are synthesized from the parent compound, which contains a basic or acidic moiety, by conventional chemical methods. Generally, such salts are, for example, prepared by reacting the free acid or base forms of these compounds with a stoichiometric amount of the appropriate base or acid in water or in an organic solvent or in a mixture of both. Generally, non-aqueous media like ether, ethyl acetate, ethanol, 2-propanol or acetonitrile are preferred. Examples of the acid addition salts include mineral acid addition salts such as, for example, hydrochloride, hydrobromide, hydroiodide, sulfate, nitrate, phosphate, and organic acid addition salts such as, for example, acetate, trifluoroacetate, maleate, fumarate, citrate, oxalate, succinate, tartrate, malate, mandelate, methanesulfonate and p-toluenesulfonate. Examples of the alkali addition salts include inorganic salts such as, for example, sodium, potassium, calcium and ammonium salts, and organic alkali salts such as, for example, ethylenediamine, ethanolamine, N,N-dialkylenethanolamine, triethanolamine and basic aminoacids salts.

Throughout the description and claims the word "comprise" and variations of the word, are not intended to exclude other technical features, additives, components, or steps.

Furthermore, the word "comprise" encompasses the case of "consisting of".

Peptide Synthesis

The synthesis of peptides according to the present invention as well as peptides of the reference examples may be carried out by conventional synthetic methods for peptides.

The process described in the next paragraphs has been actually used for the preparation of the peptides described in the examples and may be used to prepare any peptide according to the invention.

Peptides were assembled on 50 μmol (0.106 g; 0.47 mmol/g) of Fmoc-Rink-amide ChemMatrix resin in a Prelude instrument (Protein Technologies, Tucson, AZ) running optimized Fmoc synthesis protocols. Side chain protections were Boc (used to protect D-Lys, Trp and D-Trp), 2,2,4,6,7 pentamethyldihydrobenzofuran-5-sulfonyl (used to protect D-Arg), and t-butyl (used to protect Glu, Ser, Thr, Tyr and D-Tyr). Double couplings were systematically performed with a 5-fold excess of Fmoc-amino acid in the presence of 2-(1H-benzotriazol-1-yl)-1,1,3,3 tetramethyluronium hexafluorophosphate (HBTU, 5-fold excess) and DIEA (10-fold excess) with DMF as solvent for 5+5 min.

Deprotection and cleavage cocktails were $CF_3COOH$/$H_2O$/3,6-dioxa-1,8-octanedithiol (DODT)/triisopropylsilane (94:2.5:2.5:1 v/v, 90 min). The synthesis product was isolated by precipitation with chilled diethyl ether, centrifuged for 3×10 min at 4° C., taken up in $H_2O$ and lyophilized.

Peptides Analysis and Purification

The following protocol has been used to purify and analyze the peptides described in the present application.

The lyophilized crude peptides were reconstituted in a straightforward way ($H_2O$, acidified with HOAc). The crude peptides were analyzed by HPLC on Luna C18 columns (4.6×50 mm, 3 μm, Phenomenex, Torrance, CA, USA) in a LC-20AD system (Shimadzu, Kyoto, Japan). Elution was with linear gradients of solvent B (0.036% v/v TFA in $CH_3CN$) into A (0.045% v/v TFA in $H_2O$) over 15 min. The peptides were purified by preparative HPLC on Luna C18 (10×250 mm, 10 μm, Phenomenex) column in a Shimadzu LC-8A instrument using linear gradients of solvent B (0.1% v/v TFA in $CH_3CN$) into A (0.1% v/v TFA in $H_2O$) over 30 min, at 7 mL/min flow rate with UV detection at 220 nm. Fractions of satisfactory purity (>95%) by analytical HPLC were pooled, lyophilized and re-analyzed for identity by HPLC-MS on C18 (4.6×150 mm column, 3.5 μm, Phenomenex) in a Shimadzu LC-MS 2010EV instrument, eluting with linear gradients of solvent B (0.08% v/v HCOOH in $CH_3CN$) into A (0.1% v/v TFA in $H_2O$) over 15 min at 1 mL/min flow rate.

ABBREVIATIONS

The following abbreviations have been used along the present application:
Ala: L-Alanine
D-Ala: D-Alanine
D-Arg: D-Arginine
Glu: L-Glutamic acid
Gly: Glycine
Ile: L-Isoleucine
D-Ile: D-Isoleucine
Leu: L-Leucine
D-Leu: D-Leucine
D-Lys: D-Lysine
Met: L-Methionine
D-Met: D-Methionine
D-1-Nal: 1-Naphthylalanine ((2R)-2-amino-3-naphthalen-1-ylpropanoic acid)
D-2-Nal: 2-Naphthylalanine ((2R)-2-amino-3-naphthalen-2-ylpropanoic acid)

D-Nle: D-Norleucine
Phe: L-Phenylalanine
D-Phe: D-Phenylalanine
Ser: L-Serine
Thr: L-Threonine
Trp: L-Tryptophan
D-Trp: D-Tryptophan
Tyr: L-Tyrosine
D-Tyr: D-Tyrosine
Val: L-Valine
D-Val: D-Valine
CF: A rest of 5(6)-carboxyfluorescein of formula:

-Lys(CF)-NH$_2$: A rest of formula:

-D-Lys(CF)-NH$_2$: A rest of formula:

Fmoc-Lys(Mtt)-OH

EXAMPLES

Reference Example 1

A peptide of formula Glu-Thr-Tyr-Leu-Met-Phe-Trp-Ile-Gly-Val-Thr-Ser-Val-Leu-Leu-Leu-Phe-Ile-Val-Tyr-Ala-Tyr-Met-Tyr-Ile-Leu-Trp-Gly-Arg-Lys-Lys-Arg-Arg-Gln-Arg-Arg-Arg-NH$_2$ (SEQ ID NO 1—NH$_2$) was prepared using the general synthetic method explained above.

This peptide corresponds to the transmembrane region 5 of cannabinoid receptor 1 (TM5) coupled the cell penetrating peptidic sequence Tat (Gly-Arg-Lys-Lys-Arg-Arg-Gln-Arg-Arg-Arg) (SEQ ID NO 2).

HPLC: $t_R$ 8.10 min (40-90% linear gradient of B into A over 15 min). ESI-MS; m/z 1576.45 $[M+3H]^{+3}$, 1182.65 $[M+4H]^{+4}$, 946.30 $[M+5H]^{+5}$, 788.70 $[M+6H]^{+6}$, 676.20 $[M+7H]^{+7}$, 591.75 $[M+8H]^{+8}$ (MW calculated: 4727.76).

Reference Example 2

A peptide of formula Val-Tyr-Ala-Tyr-Met-Tyr-Ile-Leu-Trp-D-Ala-Gly-D-Ile-D-Leu-D-Lys-D-Arg-D-Trp-NH$_2$ was prepared using the general synthetic method explained above.

This peptide is derived from subsequence of aminoacids 19 to 27 of TM5 coupled to the cell penetrating peptide sequence D-Ala-Gly-D-Ile-D-Leu-D-Lys-D-Arg-D-Trp-NH$_2$.

HPLC: $t_R$ 5.24 min (30-60% linear gradient of B into A over 15 min). ESI-MS; m/z 1023.60 $[M+2H]^{+2}$, 682.75 $[M+3H]^{+3}$, 511.20 $[M+4H]^{+4}$, 411.90 $[M+5H]^{+5}$, 340.90 $[M+6H]^{+6}$, 292.00 $[M+7H]^{+7}$ (MW calculated: 2045.52).

Reference Example 3

A peptide of formula D-Trp-D-Leu-D-Ile-D-Tyr-D-Met-D-Ala-Gly-D-Ile-D-Leu-D-Lys-D-Arg-D-Trp-NH$_2$ using the general synthetic method explained above.

This peptide is derived from the retroenantio version of subsequence of aminoacids 23 to 27 of TM5 (D-Trp-D-Leu-D-Ile-D-Tyr-D-Met) coupled to the cell penetrating peptide sequence D-Ala-Gly-D-Ile-D-Leu-D-Lys-D-Arg-D-Trp-NH$_2$. By retroenantio version of a peptide sequence it is understood that a new peptide sequence were all aminoacids are replaced by its D-enantiomers and wherein the order of the aminoacids in the sequence is reversed.

HPLC: $t_R$ 6.33 min (20-60% linear gradient of B into A over 15 min). ESI-MS; m/z: 1549.70 $[M+1H]^{+1}$, 775.45 $[M+2H]^{+2}$, 517.35 $[M+3H]^{+3}$, 389.95 $[M+4H]^{+4}$ (MW calculated: 1548.96).

Example 1

A peptide of formula D-Trp-D-Leu-D-Ile-D-Tyr-D-Met-D-Tyr-D-Ala-D-Tyr-D-Val-D-Ala-Gly-D-Ile-D-Leu-D-Lys-D-Arg-D-Trp-NH$_2$ using the general synthetic method explained above.

This peptide is derived from the retroenantio version of subsequence of aminoacids 19 to 27 of TM5 (D-Trp-D-Leu-D-Ile-D-Tyr-D-Met-D-Tyr-D-Ala-D-Tyr-D-Val) coupled to the cell penetrating peptide sequence D-Ala-Gly-D-Ile-D-Leu-D-Lys-D-Arg-D-Trp-NH$_2$. By retroenantio version of a peptide sequence it is understood a new peptide sequence were all aminoacids are replaced by its D-enantiomers and wherein the order of the aminoacids in the sequence is reversed.

HPLC: $t_R$ 7.10 min (30-60% linear gradient of B into A over 15 min). ESI-MS; m/z: 1023.90 $[M+2H]^{+2}$, 682.70 $[M+3H]^{+3}$, 512.85 $[M+4H]^{+4}$, 409.90 $[M+5H]^{+5}$, 340.95 $[M+6H]^{+6}$, 293.00 $[M+7H]^{+7}$ (MW calculated: 2045.52).

Example 2

The peptide of example 1 has been labeled by attaching a -Lys(CF)-NH$_2$ rest at its carboxy end.

The labeling (incorporation of 5(6)-carboxyfluorescein) to the carboxy-terminal end of the peptide was carried out by adding an additional labelled lysine to peptide sequence. To do that Fmoc-Lys (Mtt)-OH was used.

In said compound the side chain of the lysine is protected with a methyltrityl (Mtt) protecting group, which can be selectively deprotected in resin in the presence of 1% TFA (under these conditions all other side chain protecting groups are stable).

After condensing said compound with the carboxy terminal amino acid of the peptide to be labelled, the methyltrityl is removed and the ε—NH$_2$ group of the "extra" lysine side chain is reacted with the group-COOH of 5(6)-carboxyfluorescein to obtain the labelled peptide. Finally the carboxy-terminal group is amidated.

This slightly modified peptide has been used to evaluate the in vitro BBB translocation and the internalization of the peptide.

Testing Methods

A. Trypsin Digestion

The stability of the peptides to the action of trypsin has been tested by the method described below.

A 1000 µg/1000 µL trypsin solution (Thermo Fisher Scientific) was prepared by suspending the lyophilized enzyme in 50 mM ammonium bicarbonate buffer, pH 8.2. Peptide dissolved in the same buffer (1 µg/L) was incubated with trypsin (peptide:trypsin ratio=100:1) for 24 h at 37° C. Samples were collected at various time points and digestion was stopped by addition of 20% (v/v) of 0.5% formic acid in H$_2$O. Samples were stored at −20° C. until analyzed by reverse-phase HPLC-MS. Experiments are performed in duplicate and data were fit with GraphPad Prism.

B. bEnd.3 Cell Culture bEnd.3 brain endothelioma cells (ATCC® CRL-2299TM) were grown as a monolayer on 75 cm$^2$ T-flasks in DMEM supplemented with 10% fetal bovine serum (FBS), and 1% penicillin/streptomycin antibiotic solution (Gibco™, USA). Cells were cultured in a humidified atmosphere of 95% air and 5% CO2 at 37° C. (MCO-18AIC (UV), Sanyo, Japan), with the medium changed every other day. The cells were harvested from cell culture T-flasks when confluent with trypsin-EDTA (Gibco™, USA) and used in different assays (cell proliferation, in vitro BBB translocation and in vitro Bimolecular Fluorescence complementation).

C. Cell Viability Assay

The in vitro cytotoxicity of the compound to be evaluated is studied using the same cell line of the in vitro BBB model, namely bEnd.3 cells, to evaluate possible toxicity. bEnd.3 cell line was exposed to increasing concentrations of the compound for 24 h.

The cytotoxicity of the peptides towards bEnd.3 cells has been tested by the CellTiter-Blue® Cell Viability Assay, according to the manufacturer's instructions as described below.

The assay is based on the ability of viable cells to reduce resazurin into resorufin, a highly fluorescent metabolite. Non-viable cells are not able to generate resorufin.

Therefore, using this approach is possible to distinguish between metabolic and non-metabolic cells, and indirectly to determine the cytotoxicity of different compounds. bEnd.3 cells were seeded onto a 96-well plate (Corning, USA) at 10,000 cells/100 µL/well and incubated for 24 h. After medium removal, 100 µL of previous diluted peptides (range between 0.01-50 µM) in DMEM medium were added to the wells. After 24 h incubation, 20 µL of CellTiter-Blue® Reagent was added to each well and incubated for 3 h in a humidified atmosphere of 5% CO$_2$ at 37° C. The fluorescence intensity was measured with an $\lambda_{exc}$=560 nm and an $\lambda_{em}$=590 nm using an Infinite F200 TECAN plate reader. Medium and 1% Triton X-100-containing medium were used as positive controls (100% cell viability) and negative controls (0% cell viability), respectively. Cell viability (%) was determined using the following equation:

$$\text{Cell Viability (\%)} = \frac{F_p - F_{NC}}{F_{PC} - F_{NC}} \times 100 \qquad \text{Equation 1}$$

where $F_p$ is the fluorescence intensity of peptide-treated cells, $F_{NC}$ is the fluorescence intensity for negative controls, and $F_{PC}$ is the fluorescence intensity for positive controls.

Experiments were performed on different days using independently grown cell cultures.

D. In Vitro BBB Translocation Assay bEnd.3 cells were allowed to grow until confluence in a culture T-flask. Cells were carefully harvested with trypsin-EDTA (Gibco™, USA) and seeded at 5,000 cells/well to 1% fibronectin-coated tissue culture inserts (transparent polyester (PET) membrane with 1.0 µm pores) for 24-well plates (BD Falcon, USA). Throughout 10 days, the medium was changed every two days. After 10 days, cells were washed two times with 1×PBS and once with DMEM medium without phenol red (Gibco/Thermo Fisher, USA). Then, peptides diluted in DMEM without phenol red to a final concentration of 1 µM were added to the apical side of the in vitro BBB model. Experiments were performed on different days using independently grown cell cultures.

The translocation of 5(6)-carboxyfluorescein-labeled peptides is determined by fluorescence emission.

Figure 1:
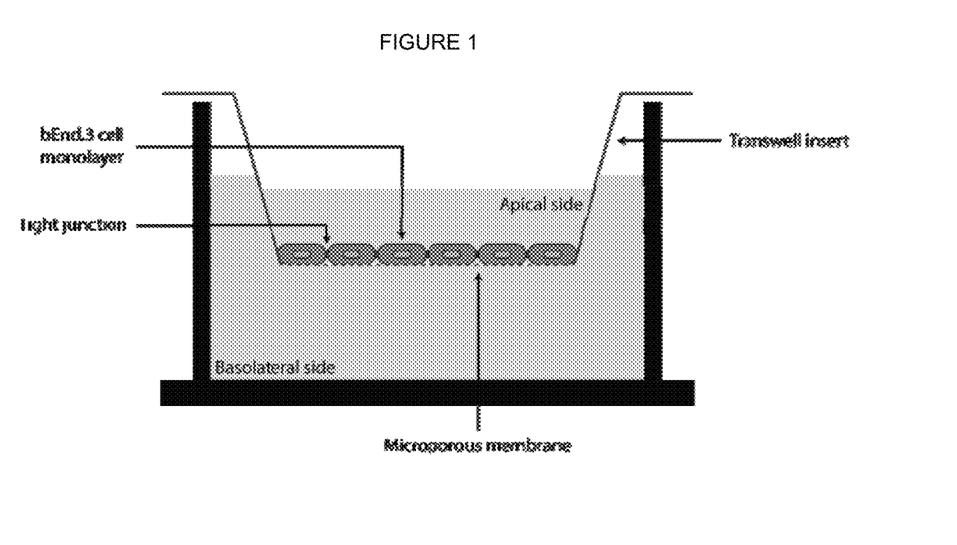

The in vitro BBB model consists of a transwell system with an insert in which bEnd.3 cells are grown separating two chambers (see FIG. 1). The insert, or apical side, corresponds to the blood side of the Blood-brain Barrier, while the basolateral side (bottom chamber) corresponds to the brain side of the barrier.

To study the translocation capabilities of a peptide, 1 µM of the 5(6)-carboxyfluorescein-labeled peptide to be evaluated was added to the apical side of the above described in vitro BBB model. The apical side volume and basolateral volume were collected after 24 h incubation and the fluorescence in those samples measured separately in a plate reader. The internalized percentage was obtained as the difference between the total fluorescence and the sum of the apical and basolateral side fluorescence.

After 24 h incubation, samples from apical and basolateral side are collected and analyzed. Fluorescence was measured using the infinite F200 TECAN plate reader. The percentage (%) of translocation was calculated using the following equation:

$$\text{Translocation (\%)} = \left(\frac{F_i - F_{cells}}{F_{peptide}} \times 1.25\right) \times 100 \qquad \text{Equation 2}$$

$F_i$ is the fluorescence intensity recovered, $F_{cells}$ is the fluorescence intensity recovered from cells without peptide incubation, and $F_{peptide}$ is the fluorescence intensity of total peptide initially added to the transwell apical side.

The integrity of the endothelial barrier is evaluated through the permeability of fluorescently-labeled dextran (FD) with a molecular weight of 4 kDa (FD4). The clearance of the fluorescent probe from the apical side in the presence or absence of the labeled-peptide provide information on the integrity of the BBB.

E. In Vitro Determination of Capacity to Disrupt $CB_1R$ and $5\text{-}HT_{2A}R$ Heteromers by Bimolecular Fluorescence Complementation The method described in "Viñals* X, Moreno* E, Lanfumey L, Cordomi A, Pastor A, de La Torre R, Gasperini P, Navarro G, Howell L A, Pardo L, Lluís C, Canela El, McCormick* P J, Maldonado* R, Robledo* P. Cognitive Impairment Induced by Delta9-tetrahydrocannabinol Occurs through Heteromers between Cannabinoid CB1 and Serotonin 5-HT2A Receptors. PLoS Biology, 13(7): e1002194 (2015)" was used with the slight modifications herein described herein to determine the in vitro capacity of the peptides to disrupt $CB_1R$ and $5\text{-}HT_{2A}R$ heteromers.

Expression Vectors

To obtain the YFP Venus hemi-truncated proteins fused to the receptors of interest ($5\text{-}HT_{2A}R$-cYFP, $CB_1R$-nYFP), $5\text{-}HT_{2A}R$ was subcloned to be in-frame with restriction sites of pcDNA3.1-cVenus, which contained the sequences encoding amino acid residues 156-238 of YFP Venus protein. Moreover, $CB_1R$ was subcloned to be in-frame with restriction sites of pcDNA3.1-nVenus, which contained the sequences encoding amino acid residues 1-155 of YFP Venus protein.

Expression of constructs was tested by confocal microscopy and the receptor fusion protein functionality by ERK1/2 phosphorylation.

Cell Culture and Transient Transfection

Human embryonic kidney (HEK-293T) cells obtained from ATCC were grown in Dulbecco's modified Eagle's medium (DMEM) (Gibco) supplemented with 2 mM L-glutamine, 100 µg/ml sodium pyruvate, 100 U/ml penicillin/streptomycin, MEM Non-Essential Amino Acids Solution (1/100), and 5% (v/v) heat inactivated fetal bovine serum (FBS) (all supplements were from Invitrogen, Paisley, Scotland, UK). Cells were maintained at 37° C. in an atmosphere of 5% $CO_2$.

Fluorescence Complementation Assays

Cells growing in 6-well dishes were transiently transfected with the cDNA encoding for $CB_1R$ fused to the YFP Venus N-terminal fragment (n-YFP) and $5\text{-}HT_{2A}R$ fused to the YFP Venus C-terminal fragment (c-YFP) by the PEI (PolyEthylenlmine, Sigma) method. Cells were incubated 4 h with the corresponding cDNA together with PEI and 150 mM NaCl in a serum-starved medium. After 4 h, the medium was changed to a fresh complete culture medium.

After 48 h, cells were treated or not with the indicated TAT-peptides (4 µM) for 4 h at 37° C. To quantify the complemented YFP Venus expression, cells were washed twice in quick succession in HBSS with 10 mM glucose, detached, and resuspended in the same buffer. To control the cell number, sample protein concentration was determined using a Bradford assay kit (Bio-Rad, Munich, Germany) using bovine serum albumin dilutions as standards. 20 µg protein were distributed into 96-well microplates (black plates with a transparent bottom, Porvair, King's Lynn, UK), and fluorescence emission at 530 nm after the excitation at 500 nm with a Mithras LB940 (Berthold Technologies, Bad Wildbad, Germany) was recorded. Protein fluorescence was determined as fluorescence of the sample minus the fluorescence of untransfected cells (basal). Cells expressing $5\text{-}HT_{2A}R$-cVenus and nVenus or $CB_1R$-nVenus and cVenus showed similar fluorescence levels to nontransfected cells.

Example 3 (Trypsin Stability of the Compound of Example 1)

HPLC analysis of the compound of example 1, upon incubation with trypsin provided as described under method A above provided the results summarized in Table 1

TABLE 1

| Compound | % at t = 0 | % at t = 24 h |
|---|---|---|
| Example 1 | 100.00 ± 2.05 | 82.96 ± 4.04 | proving that compound of example 1 is highly resistant to trypsin digestion, with over 80% of the starting peptide unaltered after 24 h.

Example 4 (Cytotoxicity of the Compound of Example 1)

The cytotoxicity of the compound of example 1 has been evaluated as provided under method B. described above and the results are summarized in Table 2 below.

TABLE 2

| Concentration (µM) | 50 | 25 | 12.5 | 6.25 | 3.12 | 1.56 | 0.78 | 0.39 | 0.20 | 0.10 | 0.049 | 0.024 | 0.012 |
|---|---|---|---|---|---|---|---|---|---|---|---|---|---|
| Cell viability (%) Example 1 | 75.7 | 96.6 | 103.6 | 96.6 | 100.0 | 102.5 | 98.9 | 101.7 | 100.2 | 95.4 | 98.7 | 98.3 | 98.3 |

From the results above it may be seen that the $EC_{50}$ value is higher than 50 µM. The experiment indicates that the compound of example 1 has no significant toxicity.

Example 5 (Translocation of the Compound of Example 2)

The translocation of the compound of example 2 (the 5(6)-carboxyfluorescein-labeled peptide of example 1) has been evaluated as provided under method D. described above.

A total of 1 µM of the peptide of example 2 (the 5(6)-carboxyfluorescein-labeled peptide of example 1) was initially added to the apical side. After 24 h of incubation, the relative amounts of the peptide in the apical side, internalization and basolateral side were quantified. The amount in the apical and basolateral side was normalized to the initial total amount of labeled-peptide added to the top and expressed as the percentage of recovered fluorescence dose. The internalized peptide is the difference between the initial amount added and the apical and basolateral side. The results are shown in table 3 below:

TABLE 3

| Compound | % apical side | % internalization | % basolateral side |
|---|---|---|---|
| Example 2 | 36.00 | 19.98 | 43.39 |

The data obtained demonstrate that the peptide of example 2 (peptide of example 1 labeled with 5(6)-carboxyfluorescein) was able to translocate the BBB, with up to 43.39±2.703% at 24 h with an internalization retention of 19.98±7.324%.

The integrity of the endothelial barrier was evaluated as described under method D. The clearance of the fluorescent probe (fluorescently-labeled dextran (FD) with a molecular weight of 4 kDa (FD4)) from the apical side in the presence or absence of the labeled-peptide was negligible, which demonstrated the lack of both fenestrations in the cell barrier and paracellular leakage.

Example 6 (In Vitro Determination of Capacity to Disrupt $CB_1R$ and $5-HT_{2A}R$ Heteromers by Bimolecular Fluorescence Complementation)

The capacity of the compound of example 1 to disrupt $CB_1R$ and $5-HT_{2A}R$ heteromers was evaluated by Bimolecular Fluorescence Complementation under the method E. described above and the results obtained are summarized in table 4.

TABLE 4

| Bimolecular fluorescence complementation (fluorescence units) of selected compounds (I) | | | | |
|---|---|---|---|---|
| Ex. | Control | Ex. 1 | Ref Ex. 1 | Ref Ex. 2 | Ref Ex. 3 |
| Fluorescense units | 21353 | 10637 | 11154 | 13568 | 16754 |
| % vs. control | 100% | 49.8 | 52.2 | 63.5 | 78.5 |

Example 7 Assessment of the Internalization of Peptides by Confocal Microscopy bEnd.3 cells were seeded 50,000 cells/200 µl on an ibiTreat-coated 8-well u-slide (Ibidi, Germany) for 24 h. Then, cells were washed carefully twice with 1×PBS and once with medium and incubated for 2 h with labeled-peptides at a final concentration of 10 µM. After 2 h, cells were washed again twice with 1×PBS and once with medium and nucleus and membrane were stained with Hoescht 33342 (ThermoFisher, USA) and CellsMask™ Deep Red (ThermoFisher, USA), respectively. Nucleus and membrane dyes were added to cells at a final concentration of 5 µg/mL and working solution of 0.5× for 10 min at 37° C. Finally, cells were washed twice with 1×PBS and imaged.

Acquisition was made on a confocal point-scanning Zeiss LSM 880 microscope (Carl Zeiss, Germany) equipped with an alpha Plan-Apochromat X 100 oil immersion objective (1.46 numerical aperture). Diode 405-30 and HeNe633 lasers were used to excite Hoescht 33342 (Sigma-Aldrich, Spain) and CellMask™ Deep Red plasma membrane stain (ThermoFisher, USA). The 488 nm line from an argon laser was used to excite the peptide of example 2 (peptide of example 1 labeled with 5(6)-carbofluorescein-Lys). In the normal confocal mode, X 0.6 zoom images were recorded at 1024×1024 resolution. ZEN software as used for image acquisition. Fiji software was used for image processing. At least 12 total images were acquired in three independent replicates. To confirm the internalization of the peptide of example 2 (i.e., the peptide of example 1 labeled with 5(6)-carbofluorescein-Lys), bEnd.3 cells were incubated with 10 UM of said peptide for 2 h at 37° C. and examined using confocal microscopy.

Figure 2:
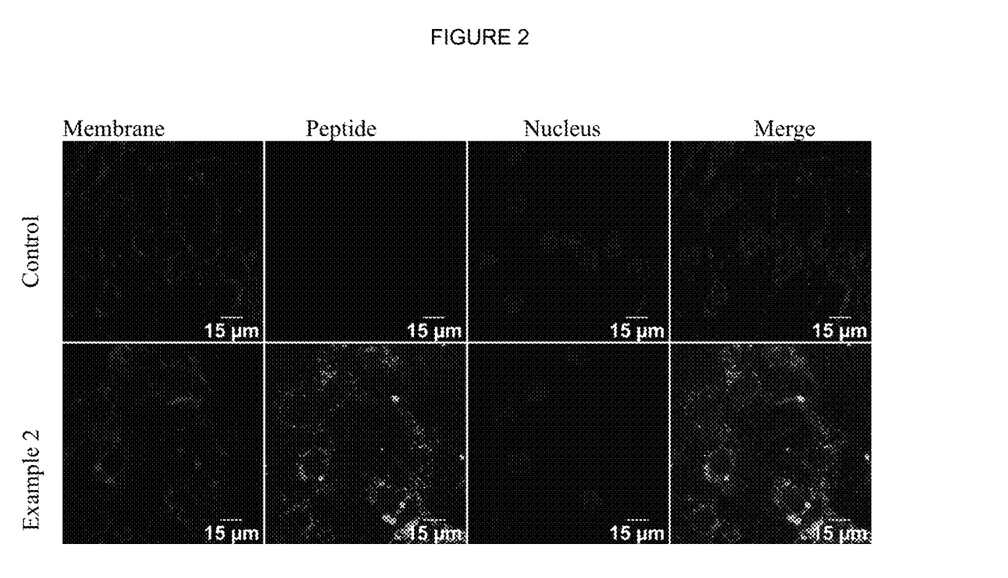

A punctate pattern of peptide fluorescence was observed indicating the presence of peptide into the vesicular compartments after internalization. This is shown in FIG. 2

Example 8: In Vivo Determination of the Effect of the Peptides on Memory (Novel Object Recognition Test)

The method described in "Puighermanal E, Marsicano G, Busquets-Garcia A, Lutz B, Maldonado R, Ozaita A. Cannabinoid modulation of hippocampal long-term memory is mediated by mTOR signaling. Nature Neuroscience, 12(9): 1152-8 (2009)" was used with the slight modifications herein described to assess the effect of the peptides on memory. The results are summarized in table 5 below.

On day 1 (Habituation), mice were habituated for 9 min to the V-maze in which the task was performed. On the second day (Training), mice were put back in the V-maze for 9 min, two identical objects were presented and the time that the mice spent exploring each object was recorded. The mice were again placed in the maze 24 h later for 9 min (Test), one of the familiar objects was replaced with a novel object and the total time spent exploring each of the two objects (novel and familiar) was computed. Object exploration was defined as the orientation of the nose to the object at less than 2 cm. A discrimination index was calculated as the difference between the times spent exploring the novel or familiar object divided by the total time exploring the two objects. A higher discrimination index is considered to reflect greater memory retention for the familiar object as normal mice spend more time exploring a novel object than a familiar one.

Treatments with the peptide to be tested in a vehicle (saline plus 2% DMSO) at a dose of 20 mg of peptide per kg of weight of the mouse or with said vehicle alone were administered intravenously (IV) immediately after training, while IP vehicle (5% v/v of ethanol, 5% v/v of Cremophor-EL and 90% v/v saline) or 3 mg of THC per kg of the mouse dissolved in the IP vehicle were administered by intraperitoneal injection (IP) 30 min after the peptide.

TABLE 5

|  | Discrimination index (mean/SD) | Discrimination index % increase vs. control |
|---|---|---|
| Vehicle (IV) + Vehicle (IP) (control) | 0.25/0.20 | — |
| Vehicle (IP) + Cpd Ex. 1 (20 mg/kg) | 0.28/0.16 | 12 |
| Vehicle (IV) + THC (3 mg/kg) | −0.13/0.30 | −52 |
| Vehicle (IP) + Cpd Ex. 1 (20 mg/kg) + Vehicle (IV) + THC (3 mg/kg) | 0.30/0.33 | 20 |

The results summarized in the table above show that co-administration of compound of example 1 overturns the detrimental effect of THC on memory.

Example 9: In Vivo Determination of the Analgesic Effect of the Peptides (Hot Plate Test)

The method described in "Monory K, Blaudzun H, Massa F, Kaiser N, Lemberger T, Schütz G, Wotjak C T, Lutz B*, Marsicano G*. Genetic Dissection of Behavioural and Autonomic Effects of D9-tetrahydrocannabinol in Mice. PLoS Biology, 5(10): e269, 2007" was used with the slight modifications herein described to assess the analgesic effect of the peptides. The results are summarized in table 6 below.

TABLE 6

|  | Licking latency (s) Mean/SD | Licking latency % increase vs control | Jumping latency (s) Mean/SD | Jumping latency % increase vs control |
|---|---|---|---|---|
| Vehicle (IV) + Vehicle (IP) (control) | 10.38/2.97 | — | 51.1/20.09 | — |
| Vehicle (IP) + Cpd Ex. 1 (20 mg/kg) | 13.90/7.29 | 33.9 | 56.40/16.22 | 10.4 |
| Vehicle (IV) + THC (10 mg/kg) | 21.20/10.37 | 104.2 | 87.60/58.13 | 71.4 |
| Vehicle (IP) + Cpd Ex. 1 (20 mg/kg) + Vehicle (IV) + THC (10 mg/kg) | 18.78/9.90 | 80.9 | 67.11/20.99 | 31.3 |

THC-induced analgesia was measured using a hot plate analgesia meter (Hot/Cold Plate Test, Bioseb, USA) 60 min after intraperitoneal injection (IP) of THC dissolved in an IP vehicle (5% v/v of ethanol, 5% v/v of Cremophor-EL and 90% v/v saline) or injection of the vehicle (saline plus 2% DMSO) alone and by intravenous injection 90 min after the first injection of the peptide to be tested in an IV vehicle or of the vehicle alone. The plate was heated to 52±0.5° C. and the time (in seconds) until mice showed the licking of the paws and the jumping response on the plate were recorded (licking and jumping latency). A cut-off time of 240 s was set to prevent tissue damage.

The coadministration of Compound of example 1 with THC allows the achievement of a substantial analgesic effect.

LIST OF REFERENCES

Non-Patent Literature Cited in the Description
1. Viñals X. et al; PLoS Biol. 2015 Jul. 9; 13(7): e1002194
2. Kandasamy R, Dawson C T, Craft R M, Morgan M M. Anti-migraine effect of Δ9-tetrahydrocannabinol in the female rat. Eur J Pharmacol. 2018 Jan. 5; 818:271-277. doi: 10.1016/j.ejphar.2017.10.054. Epub 2017 Oct. 28.
3. Baron E P, Lucas P, Eades J, Hogue O. Patterns of medicinal *cannabis* use, strain analysis, and substitution effect among patients with migraine, headache, arthritis, and chronic pain in a medicinal *cannabis* cohort. Headache Pain. 2018 May 24; 19(1): 37. doi: 10.1186/s10194-018-0862-2.
4. Russo E B. Clinical Endocannabinoid Deficiency Reconsidered: Current Research Supports the Theory in Migraine, Fibromyalgia, Irritable Bowel, and Other Treatment-Resistant Syndromes. *Cannabis* Cannabinoid Res. 2016 Jul. 1; 1(1): 154-165. doi: 10.1089/can.2016.0009.eCollection 2016.
5. Miller S, Daily L, Leishman E, Bradshaw H, Straiker A. Δ9-Tetrahydrocannabinol and Cannabidiol Differentially Regulate Intraocular Pressure. Invest Ophthalmol Vis Sci. 2018 Dec. 3; 59(15): 5904-5911. doi: 10.1167/iovs.18-24838.
6. Escudero-Lara A, Argerich J, Cabanero D, Maldonado R. Δ9-tetrahydrocannabinol (THC) alleviates pelvic hypersensitivity in a mouse model of endometriosis. IASP (International Association for the Study of Pain) 7th World Congress on Pain. Boston, USA. 12-16 Sep. 2018, Abstract ID: 471100.
7. La Porta C, Bura S A, Llorente-Onaindia J, Pastor A, Navarrete F, García-Gutiérrez M S, De la Torre R, Manzanares J, Monfort J, Maldonado R. Role of the endocannabinoid system in the emotional manifestations of osteoarthritis pain. Pain. 2015 October; 156(10): 2001-12.
8. Maldonado R, Baños J E, Cabañero D. The endocannabinoid system and neuropathic pain. Pain. 2016 February; 157 Suppl 1: S23-32.
9. Engeli S. Central and peripheral cannabinoid receptors as therapeutic targets in the control of food intake and body weight. Handb Exp Pharmacol. 2012; (209): 357-81. doi: 10.1007/978-3-642-24716-3_17.
10. Al-Ghezi Z Z, Miranda K, Nagarkatti M, Nagarkatti P S. Combination of Cannabinoids, Δ9-Tetrahydrocannabinol and Cannabidiol, Ameliorates Experimental Multiple Sclerosis by Suppressing Neuroinflammation Through Regulation of miRNA-Mediated Signaling Pathways. Front Immunol. 2019 Aug. 21; 10:1921.
11. Allen D. Dronabinol Therapy: Central Nervous System Adverse Events in Adults With Primary Brain Tumors. Clin J Oncol Nurs. 2019 Feb. 1; 23(1): 23-26.
12. Buhmann C, Mainka T, Ebersbach G, Gandor F. Evidence for the use of cannabinoids in Parkinson's disease. J Neural Transm (Vienna). 2019 July; 126(7): 913-924.
13. Valdeolivas S, Sagredo O, Delgado M, Pozo M A, Fernández-Ruiz J. Effects of a Sativex-Like Combination of Phytocannabinoids on Disease Progression in R6/2 Mice, an Experimental Model of Huntington's Disease. Int J Mol Sci. 2017 Mar. 23; 18(4).
14. Donovan K A, Oberoi-Jassal R, Chang Y D, Rajasekhara S, Haas M F, Randich A L, Portman D G. *Cannabis* Use in Young Adult Cancer Patients. J Adolesc Young Adult Oncol. 2019 Aug. 22. doi: 10.1089/jayao.2019.0039. [Epub ahead of print]

The invention claimed is:

1. A compound of formula (I)

$$AA^1-AA^2-D-Ile-D-Tyr-AA^3-D-Tyr-D-Ala-D-Tyr-D- \quad (I)$$
$$Val-D-Ala-Gly-D-Ile-D-Leu-D-Lys-D-Arg-D-Trp-NH_2$$

wherein
$AA^1$ represents an amino acid selected from the group consisting of D-Tryptophan (D-Trp), D-1-naphthylalanine (D-1-Nal) and D-2-naphthylalanine (D-2-Nal);
$AA^2$ represents an amino acid selected from the group consisting of D-Leucine (D-Leu), D-Norleucine (D-Nle) and D-Phenylalanine (D-Phe); and
$AA^3$ represents an amino acid selected from the group consisting of D-Methionine (D-Met) and D-Norleucine (D-Nle)
or a pharmaceutically acceptable salt thereof.

2. A compound according to claim 1 wherein $AA^1$ represents D-Tryptophan (D-Trp).

3. A compound according to claim 1 wherein $AA^2$ represents D-Leucine (D-Leu).

4. A compound according to claim 1, which is selected from the group consisting of:

$$D-Trp-D-Leu-D-Ile-D-Tyr-D-Met-D-Tyr-D-Ala-D-Tyr-D-$$
$$Val-D-Ala-Gly-D-Ile-D-Leu-D-Lys-D-Arg-D-Trp-NH_2$$

or a pharmaceutically acceptable salt thereof.

5. A pharmaceutical or veterinary composition comprising a therapeutically effective amount of a compound as defined in claim 1.

6. A method for the treatment in an animal, including a human, of a disease susceptible of amelioration by agonism of a $CB_1$ receptor, said method comprising administering to said animal a compound of formula (I) as recited in claim 1, or a pharmaceutically acceptable salt thereof, in combination with a $CB_1$ receptor agonist, wherein the disease susceptible of amelioration by agonism of the $CB_1$ receptor is selected from the group consisting of:
(a) pain associated with migraines osteoarthritis, endometriosis, rheumatoid arthritis or fibromyalgia,
(b) back pain,
(c) knee pain,
(d) neuropathic pain of peripheral or central origin,
(e) pain,
(f) chronic pain,
(g) anorexia,
(h) vomiting caused by chemotherapy in the treatment of cancer,
(i) glaucoma,
(j) spasticity in patients with multiple sclerosis, and
(k) movement disorders.

7. A method for reducing side effects of a $CB_1$ receptor agonist in a patient, wherein the side effects comprise memory impairment and/or anxiety alterations, said method comprising administering to said patient a compound of formula (I) as recited in claim 1, or a pharmaceutically acceptable salt thereof, in combination with the $CB_1$ receptor agonist.

8. A method according to claim 6 wherein the treatment is also capable of reducing memory impairment and/or anxiety alterations caused by the $CB_1$ receptor agonist.

9. A method according to claim 7 wherein said $CB_1$ receptor agonist is selected from the group consisting of 2-arachidonoylglycerol, 2-arachidonyl glyceryl ether, anandamide, N-arachidonoyl dopamine, palmitoylethanolamide, 11-hydroxy-Δ8-tetrahydrocannabinol, 11-hydroxy-Δ9-tetrahydrocannabinol, Cannabinol, Δ8-tetrahydrocannabinol, Δ9-tetrahydrocannabinol, 1-(5-fluoropentyl)-3-(1-naphthoyl)indole, 1-pentyl-3-(1-naphthoyl)indole, arachidonyl-2'-chloroethylamide, CP 55,940 ([(−)-cis-3-[2-hydroxy-4-(1,1-dimethylheptyl)phenyl]-trans-4-(3-hydroxypropyl)-cyclohexanol]), HU-210 (1,1-dimethylheptyl-11-hydroxy-tetrahydrocannabinol), JWH-073 ((1-Butyl-1H-indol-3-yl)-1-naphthalenylmethanone), linoleyl ethanolamide, levonantradol (CP 50,556-1), Nabilone, Nabiximols and WIN 55,212-2 (Methanone, [(3R)-2,3-dihydro-5-methyl-3-(4-morpholinylmethyl) pyrrolo[1,2,3-de]-1,4-benzoxazin-6-yl]-1-naphthalenyl-).

* * * * *